(12) United States Patent
Shi

(10) Patent No.: US 12,481,478 B2
(45) Date of Patent: Nov. 25, 2025

(54) AUDIO PLAYBACK METHOD AND DEVICE

(71) Applicant: Beijing Zitiao Network Technology Co., Ltd., Beijing (CN)

(72) Inventor: Lei Shi, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 78 days.

(21) Appl. No.: 18/570,066

(22) PCT Filed: Sep. 5, 2022

(86) PCT No.: PCT/CN2022/117120
§ 371 (c)(1),
(2) Date: Dec. 14, 2023

(87) PCT Pub. No.: WO2023/036092
PCT Pub. Date: Mar. 16, 2023

(65) Prior Publication Data
US 2024/0281201 A1    Aug. 22, 2024

(30) Foreign Application Priority Data
Sep. 13, 2021  (CN) .......................... 202111066580.0

(51) Int. Cl.
*G06F 3/16* (2006.01)
(52) U.S. Cl.
CPC .................................... *G06F 3/165* (2013.01)
(58) Field of Classification Search
CPC ......... G06F 3/165; G06F 3/16; G10L 19/008; G10L 19/24; H04N 21/439
See application file for complete search history.

(56) References Cited

U.S. PATENT DOCUMENTS

| 2003/0229901 A1* | 12/2003 | Amir .................. H04N 7/17318 348/E7.071 |
| 2005/0209847 A1 | 9/2005 | Singhal et al. |

(Continued)

FOREIGN PATENT DOCUMENTS

| CN | 102074239 A | 5/2011 |
| CN | 103051955 A | 4/2013 |

(Continued)

OTHER PUBLICATIONS

Written Opinion for International Application No. PCT/CN2022/117120, mailed Nov. 30, 2022, 9 Pages.

(Continued)

*Primary Examiner* — Phung-Hoang J Nguyen
(74) *Attorney, Agent, or Firm* — BakerHostetler

(57) ABSTRACT

An audio playback method and device are provided. The method comprises: receiving an instruction for rate adjustment, wherein the instruction for rate adjustment is used for adjusting an audio playback rate from a first multiple of a preset standard rate to a second multiple of the preset standard rate (S101); creating a second audio filter with the second multiple (S102); calling the second audio filter to perform rate change processing according to the second multiple on second audio data in a first cache to obtain third audio data, wherein the second audio data is obtained after a first audio filter performs first processing on first audio data, and the first processing comprises at least one of the following: audio decoding, format conversion, sampling, and channel conversion (S103); and playing the third audio data (S104). By means of the method, the playback smoothness of a player with respect to audio data is improved.

18 Claims, 5 Drawing Sheets

(56) References Cited

U.S. PATENT DOCUMENTS

2013/0331970 A1* 12/2013 Beckhardt .............. H04L 65/80
                   700/94
2013/0347022 A1* 12/2013 Bates .................... G06F 3/0482
                   725/25

FOREIGN PATENT DOCUMENTS

| | | |
|---|---|---|
| CN | 107105096 A | 8/2017 |
| CN | 107484009 A | 12/2017 |
| CN | 108366299 A | 8/2018 |
| CN | 108882013 A | 11/2018 |
| CN | 111918093 A | 11/2020 |
| CN | 113014981 A | 6/2021 |

OTHER PUBLICATIONS

International Patent Application No. PCT/CN2022/117120; Int'l Search Report; dated Nov. 30, 2022; 3 pages.
First Office Action for Chinese Patent Application No. 202111066580.0, mailed on May 29, 2025, 18 pages.

* cited by examiner

AUDIO PLAYBACK METHOD AND DEVICE

CROSS-REFERENCE TO RELATED APPLICATION(S)

The application is a U.S. National Stage Application of PCT Application Serial No. PCT/CN2022/117120, filed Sep. 5, 2022, which claims the priority of Chinese Patent Application No. 202111066580.0, filed with the Chinese Patent Office on Sep. 13, 2021, and entitled "AUDIO PLAYBACK METHOD AND DEVICE", which are incorporated herein by reference in their entireties.

FIELD

Embodiments of the present disclosure relate to the technical field of audio processing, and in particular to a method for audio playback, and a device.

BACKGROUND

Electronic devices are used in a wider range over time because of their increasingly powerful function. People may play audio while using electronic devices, and when playing audio, a user may adjust the audio playback rate. For example, the user may adjust the audio playback rate to twice the standard rate.

Therefore, how to ensure playback smoothness when adjusting the audio playback rate is an urgent problem to be solved.

SUMMARY

A method for audio playback and a device thereof are provided in embodiments of the present disclosure. Accordingly, playback smoothness may be ensured while the audio playback rate is adjusted.

In a first aspect, a method for audio playback is provided in an embodiment of the present disclosure. The method includes:
  receiving an instruction for rate adjustment, wherein the instruction for rate adjustment is configured to adjust an audio playback rate from a first multiple of a preset standard rate to a second multiple of the preset standard rate;
  creating a second audio filter with the second multiple;
  calling the second audio filter to perform rate change processing according to the second multiple on second audio data in a first cache to obtain third audio data, wherein the second audio data is obtained after a first audio filter performs first processing on first audio data, and the first processing includes at least one of the following: audio decoding, a format conversion, sampling, and a channel conversion; and
  playing the third audio data.

In a second aspect, an electronic device is provided in an embodiment of the present disclosure. The electronic device includes:
  an instruction for rate adjustment reception module configured to receive an instruction for rate adjustment, wherein the instruction for rate adjustment is configured to adjust an audio playback rate from a first multiple of a preset standard rate to a second multiple of the preset standard rate;
  a filter creation module configured to create a second audio filter with the second multiple;
  a first rate change processing module configured to call the second audio filter to perform rate change processing according to the second multiple on second audio data in a first cache to obtain third audio data, wherein the second audio data is obtained after a first audio filter performs first processing on first audio data, and the first processing includes at least one of the following: audio decoding, a format conversion, sampling, and a channel conversion; and
  a first audio playback module configured to play the third audio data.

In a third aspect, an electronic device is provided in an embodiment of the present disclosure. The electronic device includes: at least one processor and a memory;
  the memory stores computer-executable instructions; and
  the processor executes the computer-executable instructions to cause the electronic device to implement the method in the first aspect.

In a fourth aspect, a computer-readable storage medium is provided in an embodiment of the present disclosure. The computer-readable storage medium stores computer-executable instructions, wherein the computer-executable instructions, when being executed by a processor, cause an electronic device to implement the method in the first aspect.

In a fifth aspect, a computer program is provided in an embodiment of the present disclosure. The computer program is configured to implement the method in the first aspect.

In a sixth aspect, a computer program product is provided in an embodiment of the present disclosure. The computer program product includes computer instructions, where the computer instructions are configured to implement the method in the first aspect.

The method for audio playback and the device thereof are provided in the embodiments of the present disclosure. The method includes: receiving the instruction for rate adjustment, wherein the instruction for rate adjustment is configured to adjust the audio playback rate from the first multiple of the preset standard rate to the second multiple of the preset standard rate; creating the second audio filter with the second multiple; calling the second audio filter to perform rate change processing according to the second multiple on the second audio data in the first cache to obtain the third audio data, wherein the second audio data is obtained after the first audio filter performs first processing on the first audio data, and first processing includes at least one of the following: audio decoding, a format conversion, sampling, and a channel conversion; and playing the third audio data. In the embodiments of the present disclosure, a processor for changing rate that performs first processing and rate change processing is split into two processors, one is the first audio filter, which is configured to perform first processing, and the other one is the second audio filter, which is configured to perform rate change processing. In this way, when the instruction for rate adjustment is received, a second new audio filter may be recreated to perform rate change processing on the audio data that have undergone first processing by the first audio filter but have not undergone rate change processing. Therefore, the audio data that undergo first processing through the first audio filter but have not undergone rate change processing may be prevented from being lost, and smoothness of playing the audio data by a player is improved.

BRIEF DESCRIPTION OF THE DRAWINGS

In order to describe the technical solutions in embodiments of the present disclosure or in the prior art more clearly, the accompanying drawings required for describing the embodiments or the prior art are briefly described below. Apparently, the accompanying drawings in the following description show some embodiments of the present disclosure. Those of ordinary skill in the art can also derive other accompanying drawings from these accompanying drawings without creative efforts.

DETAILED DESCRIPTION OF EMBODIMENTS

In order to make the objectives, technical solutions, and advantages in embodiments of the present disclosure clearer, the technical solutions in the embodiments of the present disclosure are clearly and completely described below with reference to the accompanying drawings in the embodiments of the present disclosure. Apparently, embodiments described above are some examples rather than all examples of the present disclosure. Based on embodiments of the present disclosure, all other embodiments derived by those of ordinary skill in the art without creative efforts fall within the scope of protection of the present disclosure.

Embodiments of the present disclosure may be applied to an electronic device. The electronic device may be any device having an audio playback function, such as a mobile phone, a tablet computer, and a computer.

The above described electronic device plays audio at a preset standard rate by default. In a process of playing the audio, a user may enable the audio to be played at a multiple of a rate, that is, adjust an audio playback rate to be multiple of the preset standard rate.

Figure 1:
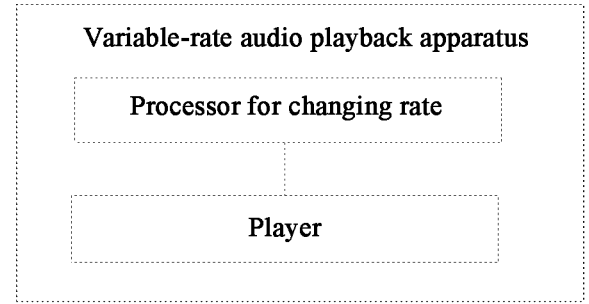
FIG. 1 illustratively shows a schematic structural diagram of a variable-rate audio playback apparatus in the prior art.

The above described process of playing the audio at the multiple of rate may be implemented by a variable-rate audio playback apparatus. FIG. 1 illustratively shows a schematic structural diagram of a variable-rate audio playback apparatus according to the prior art. With reference to FIG. 1, the variable-rate audio playback apparatus may include a processor for changing rate and a player.

When the variable-rate audio playback apparatus shown in FIG. 1 is employed for audio playback, firstly, the variable-rate apparatus may perform at least one type of first processing on original audio data including, but not limited to, a format conversion, a channel conversion, audio decoding, and sampling. Then, the variable-rate apparatus may perform rate change processing on the first processed audio data. Finally, the player may play rate changed audio data.

In practical application, since audio is typically required to be encoded before transmission, i.e. analog audio data is converted into digital audio data, audio is required to be decoded before being played, i.e. the digital audio data is converted into the analog audio data.

Format conversion is configured to convert an audio format from a first format to a second format supported by the player. Certainly, it is not required to perform format conversion if the player supports the first format. The audio format may include, but is not limited to, a media player three (MP3), a free lossless audio codec (FLAC), and a windows wave (WAV).

Sampling is a process of converting a sound wave into binary data.

Channel conversion converts audio sound channels. For example, channel conversion may convert audio from one channel into audio having two channels or convert audio having four channels into audio having two channels.

The processor for changing rate in the above process may be an audio video filter (avfilter) provided by a fast forward moving picture expert group (ffmpeg), which is an open-source computer program that may be configured to record, convert, and stream digital audio and video. Since embodiments of the present disclosure only use an audio processing function of the above processor for changing rate, the processor for changing rate is referred to as an audio filter in the embodiments of the present disclosure.

In the prior art, since rate change parameters of the above avfilter are set at the time of creation and may not be modified subsequently, the avfilter may only perform rate change processing according to the rate change parameters set at the time of creation after being created, instead of adjusted rate change parameters of an original avfilter. Therefore, it is required to create a new avfilter, that is, a new processor for changing rate and set rate change parameters to the adjusted rate change parameters, in order to realize audio playback according to different rate change parameters. However, since the processor for changing rate performs first processing as well as rate change processing, first processed audio data which has not undergone rate change processing by the processor for changing rate are lost after a processor for changing rate is recreated. Therefore, the audio data played by the player are discontinuous, that is, playback smoothness is undesirable.

In order to solve the above technical problems, the processor for chanting rate which performs first processing and rate change processing is split into two processors in an embodiment of the present disclosure, one is a first audio filter, which is configured to perform first processing, and the other one is a second audio filter, which is configured to perform rate change processing. In this way, when an instruction for rate adjustment is received, a second new audio filter may be recreated to perform rate change processing on the audio data that has been undergone first processing from the first audio filter but has not undergone rate change processing. Therefore, the audio data that has undergone first processing from the first audio filter but has not undergone rate change processing may be prevented from being lost, and smoothness of playing the audio data by the player is improved.

The technical solutions according to embodiments of the present disclosure and the way to solve the above technical problems through the technical solutions of the present disclosure are described in detail below with reference to specific embodiments. Several specific embodiments may be combined with one another below, and the same or similar concepts or processes may not be repeated in some embodiments. Embodiments of the present disclosure will be described below with reference to the accompanying drawings.

Figure 2:
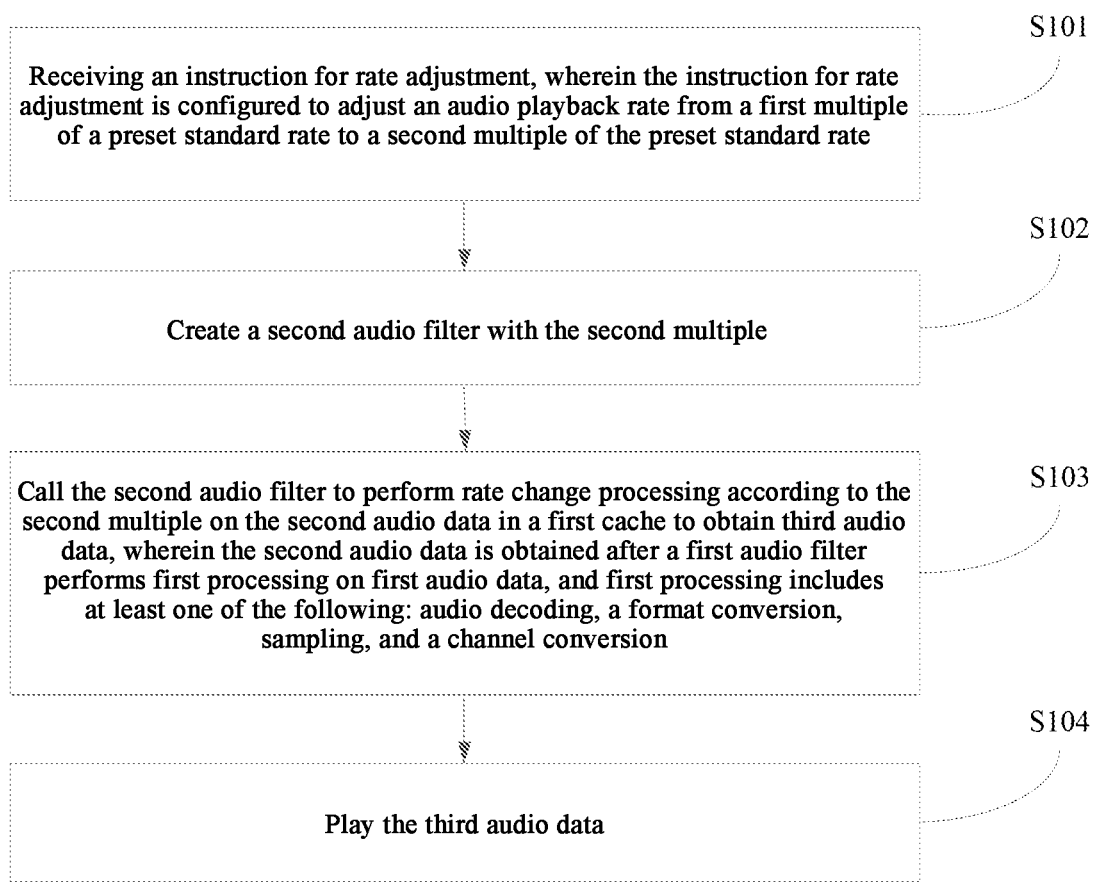
FIG. 2 illustratively shows a flowchart of steps for a method for audio playback according to an embodiment of the present disclosure.

With reference to FIG. 2, a flowchart of steps of a method for audio playback according to an embodiment of the present disclosure is illustratively shown in FIG. 2. The method shown in FIG. 2 may be applied to an electronic device. With reference to FIG. 2, the method for audio playback may include:

S101: receiving an instruction for rate adjustment, wherein the instruction for rate adjustment is configured to adjust an audio playback rate from a first multiple of a preset standard rate to a second multiple of the preset standard rate.

The instruction for rate adjustment may be an instruction triggered by a user on an audio playback interface, and is configured to adjust the audio playback rate from a second rate to a first rate. The second rate is the first multiple of the preset standard rate, and the first rate is the second multiple of the preset standard rate. It can be understood that when the first multiple is 1 and the second multiple is 2, the instruction for rate adjustment is configured to adjust the audio playback rate from the preset standard rate to double preset standard rate, that is, to play audio at double rate.

According to an embodiment of the present disclosure, a rate change parameter of the avfilter may be denoted by multiple of the preset standard rate, for example, the second multiple and the first multiple. Certainly, the multiple may be greater than or less than 1. Accelerated playback is indicated when the multiple is greater than 1. Decelerated playback is indicated when the multiple is less than 1.

S102: creating a second audio filter with the second multiple.

In the prior art, rate change parameters of an audio filter configured to perform rate change processing are set when the audio filter is created and may not be modified subsequently. Therefore, it is impossible to implement rate change processing according to the second multiple by the original audio filter according to the first multiple.

In order to implement rate change processing according to the second multiple, it is required to create a new audio filter as the second audio filter and set a rate change parameter of the second audio filter to be the second multiple.

In an embodiment, before creating the second audio filter, it is required to determine whether an unplayed-back audio data amount obtained through a rate change according to the first multiple reaches a preset unit playback amount. If yes, the second audio filter with the second multiple is created, so as to proceed to S103. If not, no second audio filter with the second multiple will be created, and rate change processing is performed on second audio data in a first cache according to the original first multiple, until the unplayed-back audio data amount obtained through a rate change according to the first multiple reaches the preset unit playback amount, and the method proceeds to the step that the second audio filter with the second multiple is created.

The unplayed-back audio data amount obtained through the rate change according to the first multiple may be an audio data amount of third audio data in a second cache.

In practical application, the player plays the audio according to a preset unit playback amount. Audio data not reaching the preset unit playback amount may not be played by the player, and thus are discarded. Therefore, if the unplayed-back audio data amount obtained through the rate change according to the first multiple does not reach the preset unit playback amount, creating the second audio filter with the first multiple may cause the unplayed-back audio data obtained through the rate change according to the first multiple to be discarded, and the playback smoothness is undesirable.

In order to solve the above problem, the second audio filter is created when the above condition is satisfied in the embodiments of the present disclosure. Accordingly, second complete audio data that may be played may be obtained through rate change processing by a second original audio filter with the first multiple. Since the second audio data segment may be played, and thus will not be discarded, which is conducive to further improvement of the playback smoothness.

S103: calling the second audio filter to perform rate change processing according to the second multiple on the second audio data in the first cache, so as to obtain third audio data, wherein the second audio data is obtained after a first audio filter performs first processing on first audio data, and the first processing at least includes one of the following: audio decoding, a format conversion, sampling, and a channel conversion.

Rate change processing may be performed one or more times. The second audio filter in FIG. 3 fetches a certain amount of second audio data from the first cache in FIG. 3 to perform rate change processing thereon during each rate change processing. Rate change processing is continuously performed in such a way until the first cache is emptied.

The above rate change processing may be interpreted as adjusting playback duration on the premise of keeping audio contents unlost, that is, converting audio that may be played completely in a duration of t1 into audio that may be played completely in duration of t2. When t1 is greater than t2, the rate change parameter becomes greater, and an audio data amount corresponding to the duration of t2 is typically greater than that corresponding to the duration of t1, so that the accelerated playback is implemented. When t1 is less than t2, the rate change parameter becomes smaller, and an audio data amount corresponding to the duration of t2 is typically less than that corresponding to the duration of t1, so that the decelerated playback is implemented.

Figure 3:
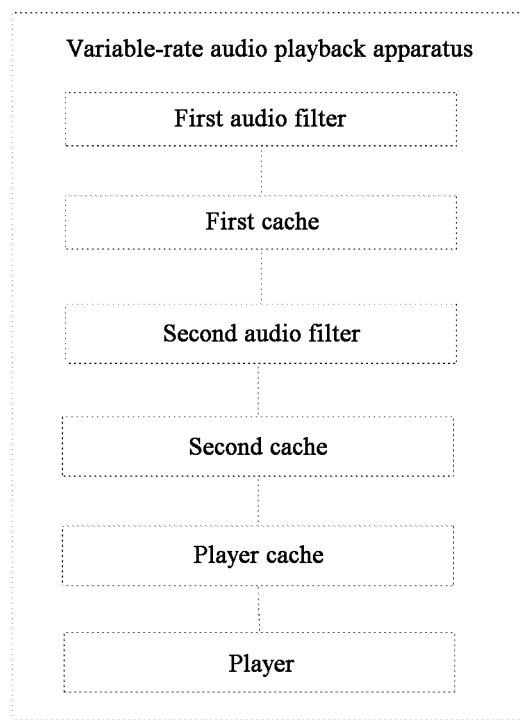
FIG. 3 illustratively shows a schematic structural diagram of a variable-rate audio playback apparatus according to an embodiment of the present disclosure.

After being obtained, the third audio data may be stored in a second cache corresponding to the second audio filter in FIG. 3. When the preset unit playback amount is reached, the third audio data of the preset unit playback amount are moved from the second cache shown in FIG. 3 to a player cache shown in FIG. 3, so as to be played by the player. In this case, the second audio data moved to the player cache are no longer stored in the second cache.

Certainly, the second cache and the player cache may also be merged into one cache, which will not be limited in the embodiments of the present disclosure.

In practical application, before performing first processing, the first audio filter may determine whether the first cache reaches the preset audio data amount. If the preset audio data amount is reached, it means that the first cache is full, and in this case, the first audio filter is required to stop performing first processing. If the preset audio data amount is not reached, it means that the first cache is not full, and in this case, the first audio filter may perform first processing and store the second audio data obtained through first processing in the first cache.

In an embodiment, before calling the second audio filter to perform rate change processing according to the second multiple on the second audio data in the first cache, a first mark of the second audio data in the first cache may also be deleted. Since the first mark is configured to indicate that the second audio data have undergone rate change processing but have not been played, the second audio data corresponding to the deleted first mark in this case is audio data that have undergone rate change processing according to the first multiple but have not been played.

It can be understood that after the first mark is deleted, it means that the second audio data have not undergone rate change processing, and thus are required to reundergo rate change processing according to the second multiple. Therefore, the second audio data that have undergone rate change processing according to the first multiple but have not been played may reundergo rate change processing according to the second multiple for playback. In this way, it is ensured that the unplayed-back audio data are played at a changeable rate according to a new rate change parameter. Accordingly, the response delay to the instruction for rate adjustment is reduced, and the response timeliness to the instruction for rate adjustment is improved.

Corresponding to the above deletion of the first mark, the second audio data is required to be configured with the first mark before rate change processing is performed on the second audio data according to any multiple, which means that rate change processing on the second audio data segment has been started. Moreover, when an audio data amount obtained by performing rate change processing on the second audio data in the first cache reaches the preset unit playback amount, the second audio data having the first mark are deleted from the first cache.

The above process may ensure the deletion accuracy of the second audio data that have undergone rate change processing in the first cache, and avoid deleting second audio data that have not undergone rate change processing completely. Accordingly, the playback smoothness is further improved.

In an example, the audio data amount in the player cache may be determined in the embodiments of the present disclosure, in order to avoid storing the third audio data in the player cache when the player cache is full. Rate change processing is performed on the second audio data in the first cache when the audio data amount is less than or equal to a first data amount threshold.

It should be noted that when the audio is played at the preset standard rate, it may be deemed that rate change processing is performed on the audio according to a multiple 1, and the audio data amounts before and after a rate change are the same, which is the preset unit playback amount M.

When the audio is played at an audio playback rate greater than the preset standard rate, rate change processing is performed on the audio according to a multiple greater than 1, and an audio data amount after a rate change is less than that before the rate change.

When the audio is played at an audio playback rate less than the preset standard rate, rate change processing is performed on the audio according to a multiple less than 1, and an audio data amount after a rate change is greater than that before the rate change.

S104: playing the third audio data.

It can be understood that the third audio data may be audio data obtained through one or more rate change processing.

When a data amount of third audio data obtained through one-time rate change processing reaches the preset unit playback amount, the third audio data is stored into the player cache from the second cache, and the third audio data are deleted from the second cache. Then the player is called to play the third audio data in the player cache. In practical application, when the second multiple is less than or equal to 1, the data amount of the third audio data obtained through one-time rate change processing reaches the preset unit playback amount. It should be noted that three independent caches including the first cache, the second cache, and the player cache, are employed to reduce noise and current sound generated when the audio data is played.

When the data amount of the third audio data obtained through one-time rate change processing does not reach the preset unit playback amount, audio data is continually acquired from the first cache, and undergoes rate change processing according to the second multiple until the third audio data obtained through rate changes accumulatively reaches the preset unit playback amount. The third audio data accumulatively reaching the preset unit playback amount is stored in the player cache. The player is called to play the third audio data in the player cache. In practical application, when the second multiple is greater than 1, the data amount of the third audio data obtained through one-time rate change processing does not reach the preset unit playback amount. For example, if the second multiple is 2, a data amount of third audio data obtained through rate change processing twice reaches the preset unit playback amount.

In an embodiment, after receiving the instruction for rate adjustment, since the second multiple is different from the first multiple, a size of the first cache may be adjusted in order to properly use a cache space. In an embodiment of the present disclosure, the size of the first cache may be adjusted according to a preset function and the second multiple, wherein the preset function is configured to denote a corresponding relationship among a size of the player cache, a size of the first cache, and the audio playback rate.

The size of the player cache may be set according to an actual application scenario. When a smaller player cache is set, the real-time performance of the audio playback is more desirable. On the contrary, when a larger player cache is set, the real-time performance of the audio playback is less desirable. The size of the player cache is fixed after being set and does not vary with the audio playback rate.

The preset function may be obtained based on historical experience. Since the size of the player cache is fixed, the size of the first cache varies with the audio playback rate. When the audio playback rate becomes greater, the first cache is expanded; and when the audio playback rate becomes smaller, the first cache is shrunk.

Figure 4:
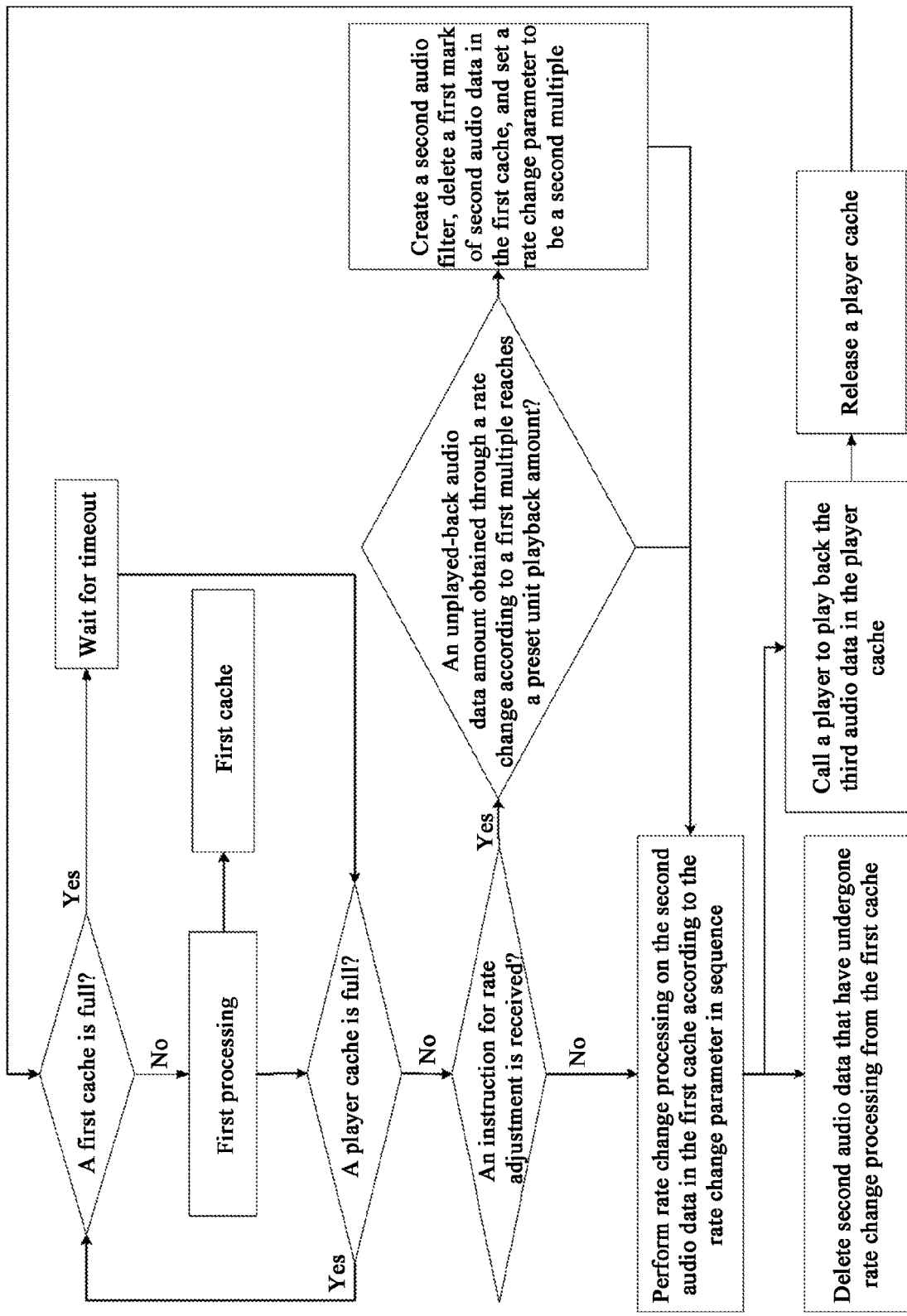
FIG. 4 illustratively shows a schematic diagram of a detailed process of a method for audio playback according to an embodiment of the present disclosure.

FIG. 4 illustratively shows a schematic diagram of a detailed process of a method for audio playback according to an embodiment of the present disclosure. As can be seen from FIG. 4, the detailed process of the method for audio playback may include:

S1: determining whether a first cache is full. When the first cache is not full, the method proceeds to S2; and when the first cache is full, the method proceeds to S4.

It can be understood that the determination of whether the first cache is full is performed before first processing is performed on first audio data. Therefore, a condition that the second audio data after first processing may not be stored when the first cache is full may be avoided.

S2: performing first processing on the first audio data, and proceeding to S3 and S5.

S3: storing the second audio data after first processing in the first cache.

S4: not performing first processing wait during a time period of waiting for timeout, that is, waiting for a preset time period. After waiting for the duration of the preset time period, the method proceeds to S5.

The preset time period may be determined according to a playback duration of the preset unit playback amount, and may be a multiple of the playback duration of the preset unit playback amount, including multiple being 1. In order to ensure the accuracy of the preset duration, the playback duration of the preset unit playback amount may be counted in real time to update the preset duration.

S5: determining whether a player cache is full. When the player cache is full, the method proceeds to S1; and when the player cache is not full, the method proceeds to S6.

It can be understood that when the player cache is not full, rate change processing is performed, so that third audio data undergoing rate change processing may be stored in the player cache. When the player cache is full, no rate change processing is performed, so that the condition that third audio data undergoing rate change processing may not be stored is avoided.

S6: determining whether an instruction for rate adjustment is received. When the instruction for rate adjustment is received, the method proceeds to S7; and when no instruction for rate adjustment is received, the method proceeds to S9.

It can be understood that when no instruction for rate adjustment is received, rate change processing is still performed on the second audio data in the first cache according to an original first multiple.

S7: determining whether an unplayed-back audio data amount obtained through a rate change according to the first multiple reaches the preset unit playback amount. When the preset unit playback amount is reached, the method proceeds to S8; and when the unplayed-back audio data amount obtained through the rate change according to the first multiple does not reach the preset unit playback amount, the method proceeds to S9.

The unplayed-back audio data amount obtained through the rate change according to the first multiple may be an audio data amount in a second cache.

S8: creating a second audio filter, deleting a first mark of the second audio data in the first cache, setting a rate change parameter to be a second multiple, and the method proceeds to S9.

S9: performing rate change processing on the second audio data in the first cache according to the rate change parameter sequentially, and the method proceed to S10 and S11.

S10: deleting second audio data that have undergone rate change processing from the first cache.

Specifically, when an audio data amount of the third audio data in the second cache reaches the preset unit playback amount, the second audio data having the first mark are deleted from the first cache.

S11: calling a player is to play the third audio data in the player cache.

S12: releasing the player cache.

Each time the player cache plays audio data in the preset unit playback amount, the player cache deletes the audio data in the preset unit playback amount that are played this time after the audio data in the preset unit playback amount has been played completely.

Figure 5:
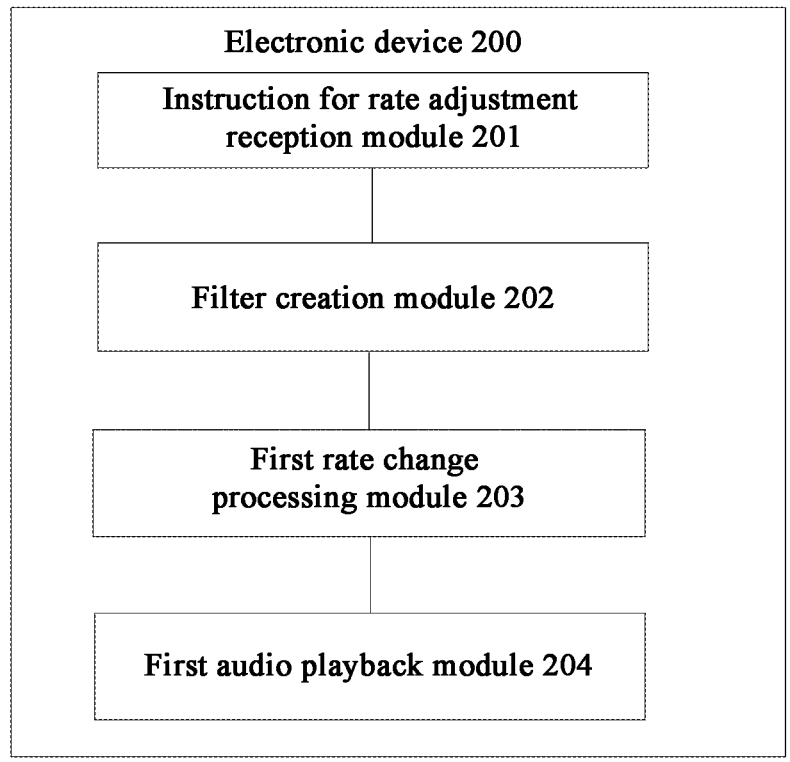
FIG. 5, FIG. 6, and FIG. 7 illustratively show structural block diagrams of three electronic devices according to embodiments of the present disclosure.

Corresponding to the method for audio playback in the above embodiment, FIG. 5 illustratively shows a structural block diagram of an electronic device according to an embodiment of the present disclosure. For the sake of description, only portions relevant to the embodiment of the present disclosure are shown. With reference to FIG. 5, the above described electronic device 200 includes an instruction for rate adjustment reception module 201, a filter creation module 202, a first rate change processing module 203, and a first audio playback module 204.

The instruction for rate adjustment reception module 201 is configured to receive an instruction for rate adjustment, wherein the instruction for rate adjustment is configured to adjust an audio playback rate from a first multiple of a preset standard rate to a second multiple of the preset standard rate.

The filter creation module 202 is configured to create a second audio filter with the second multiple.

The first rate change processing module 203 is configured to call the second audio filter to perform rate change processing according to the second multiple on second audio data in a first cache, so as to obtain third audio data, wherein the second audio data is obtained after a first audio filter performs first processing on first audio data, and the first processing at least includes one of the following: audio decoding, a format conversion, sampling, and a channel conversion.

The first audio playback module 204 is configured to play the third audio data.

In an embodiment, the filter creation module 202 described above is further configured to:
    create the second audio filter with the second multiple in response to determining that an unplayed-back audio data amount obtained through a rate change according to the first multiple reaches a preset unit playback amount.

In an example, the above electronic device 200 further includes:
    a first mark deletion module configured to delete a first mark of the second audio data in the first cache before the step of calling the second audio filter to perform rate change processing according to the second multiple on second audio data in a first cache so as to obtain third audio data, wherein the first mark is configured to indicate that the second audio data have undergone rate change processing but have not been played.

In an embodiment, the above electronic device 200 further includes:
    a second rate change processing module configured to perform rate change processing on the second audio data in the first cache according to the first multiple, in response to determining that an unplayed-back audio data amount obtained through a rate change according to the first multiple does not reach the preset unit playback amount, until the unplayed-back audio data amount obtained through the rate change according to the first multiple reaches the preset unit playback amount, and proceed to a step of creating a second audio filter with the second multiple.

In an embodiment, the above electronic device 200 further includes:
    a mark module configured to set the second audio data with the first mark in the first cache before rate change processing is performed on the second audio data in the first cache.

In an embodiment, the above electronic device 200 further includes:
    an audio data deletion module configured to delete the second audio data having the first mark from the first cache when an audio data amount obtained by performing rate change processing on the second audio data in the first cache reaches the preset unit playback amount.

In an example, the third audio data are stored in a second cache, and the first audio playback module 204 described above is further configured to:
    store the third audio data from the second cache into a player cache and delete the third audio data from the second cache when a data amount of the third audio data reaches the preset unit playback amount; call a player to play the third audio data in the player cache.

In an example, the first rate change processing module 203 described above is further configured to:
    call the second audio filter to perform rate change processing according to the second multiple on the second audio data in the first cache to obtain the third audio data, in response to determining that an audio data amount in the player cache is less than or equal to a first data amount threshold.

In an example, the above electronic device 200 further includes:
a first cache size adjustment module configured to adjust a size of the first cache according to a preset function and the second multiple, wherein the preset function is configured to denote a corresponding relationship among a size of the player cache, the size of the first cache, and the audio playback rate.

The electronic device according to the embodiments may be configured to execute the technical solution in the method embodiments shown in FIG. 2, and has similar implementation principles and technical effects as those in the method example, which will not be repeated in the embodiment.

Figure 6:
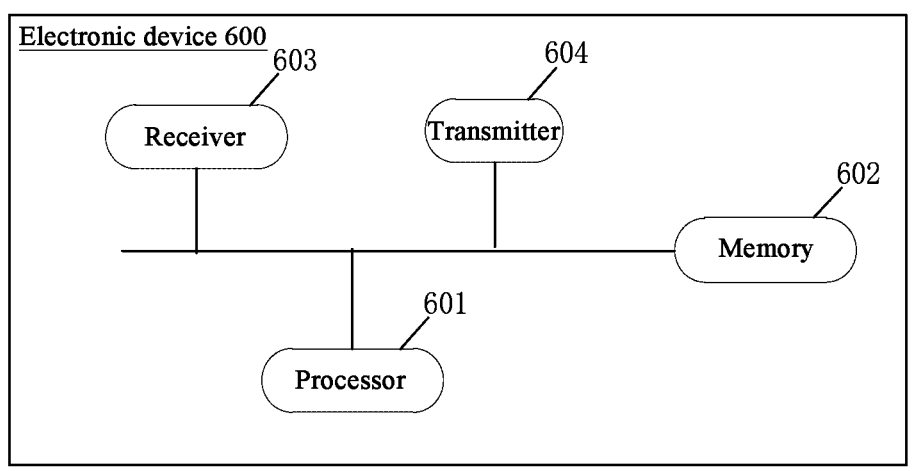

FIG. 6 illustratively shows a structural block diagram of an electronic device 600 according to an embodiment of the present disclosure. The electronic device 600 includes a memory 602 and at least one processor 601; wherein
the memory 602 stores computer-executable instructions; and
the computer-executable instructions stored in the memory 602 cause the electronic device 601 to implement the method for audio playback in FIG. 2 described above when being executed by at least one processor 601.

In addition, the electronic device may further include a receiver 603 and a transmitter 604, wherein the receiver 603 is configured to receive information from other apparatuses or devices and forward the information to the processor 601, and the transmitter 604 is configured to transmit information to other apparatuses or devices.

Figure 7:
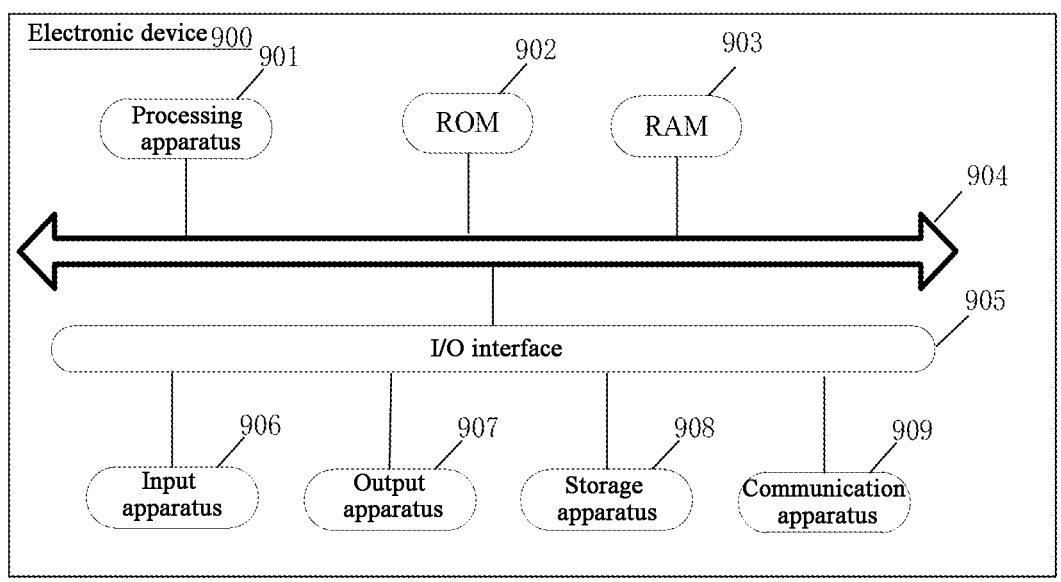

Further, with reference to FIG. 7, a schematic structural diagram of an electronic device 900 suitable for implementing an embodiment of the present disclosure is shown in FIG. 7. The electronic device 900 may be a terminal device. The terminal device may include, but is not limited to, mobile terminals such as a mobile phone, a notebook computer, a digital broadcast receiver, a personal digital assistant (PDA), a portable android device (PAD), a portable media player (PMP), an in-vehicle terminal (for example, and an in-vehicle navigation terminal), and fixed terminals such as a digital television (TV) and a desktop computer. The electronic device shown in FIG. 7 is merely illustrative, and should not limit the functions and applicable scope in the example of the present disclosure in any way.

As shown in FIG. 7, the electronic device 900 may include a processing apparatus 901 (for example, a central processing unit or a graphic processor) that may execute various suitable actions and processing according to a program stored in a read-only memory (ROM) 902 or loaded into a random access memory (RAM) 903 from a storage apparatus 908. The RAM 903 may also store various programs and data required for an operation of the electronic device 900. The processing apparatus 901, the ROM 902, and the RAM 903 are connected to one another through a bus 904. An input/output (I/O) interface 905 is also connected to the bus 904.

Typically, the I/O interface 905 may be connected to the following apparatuses: an input apparatus 906 such as a touch screen, a touch pad, a keyboard, a mouse, a camera, a microphone, an accelerometer, and a gyroscope; an output apparatus 907 such as a liquid crystal display (LCD), a speaker, and a vibrator; a storage apparatus 908 such as a magnetic tape and a hard disc; and a communication apparatus 909. The communication apparatus 909 may allow wireless or wired communication between the electronic device 900 and other devices for data exchange. Although FIG. 7 shows the electronic device 900 having various apparatuses, it should be understood that not all the apparatuses shown are required to be implemented or configured, and more or fewer apparatuses may be implemented or configured alternatively.

Particularly, the above processes described with reference to the flowcharts may be implemented as computer software programs according to the embodiments of the present disclosure. For example, an embodiment of the present disclosure includes a computer program product. The computer program product includes a computer program carried on a computer-readable medium and encompassing program codes configured to execute the method shown in the flowchart. In such an embodiment, the computer program may be downloaded and mounted via a network through the communication apparatus 909, mounted via the storage apparatus 908, or mounted via the ROM 902. The computer program executes the above functions defined in the method in the embodiment of the present disclosure when being executed by the processing apparatus 901.

It should be noted that the above computer-readable medium of the present disclosure may be a computer-readable signal medium, a computer-readable storage medium, or any combination of the above. The computer-readable storage medium may include, but is not limited to, an electronic, magnetic, optical, electromagnetic, infrared, or semiconductor system, apparatus, or device, or any combination thereof. More specific instances of the computer-readable storage medium may include, but are not limited to, a portable computer magnetic disc, a hard disc, a random access memory (RAM), a read-only memory (ROM), an erasable programmable read-only memory (EPROM), an optical fiber, a portable compact disc read-only memory (CD-ROM), an optical storage device, and a magnetic storage device that are each electrically connected through one or more wires, or any suitable combination of the above. In the present disclosure, the computer-readable storage medium may be any tangible medium that encompasses or stores a program. The program may be used by or in connection with an instruction execution system, apparatus, or device. In the present disclosure, however, the computer-readable signal medium may include a data signal propagating in a baseband or as part of a carrier wave, having computer-readable program codes carried thereon. Such a propagated data signal may take a variety of forms including, but not limited to, an electromagnetic signal, an optical signal, or any suitable combination of the above. The computer-readable signal medium that may also be any computer-readable medium besides the computer-readable storage medium, may send, propagate, or transmit a program to be used by or in connection with the instruction execution system, apparatus, or device. The program codes encompassed on the computer-readable medium may be transmitted via any suitable medium, including, but not limited to: a wire, an optic cable, a radio frequency (RF), etc., or any suitable combination of the above.

The above computer-readable medium may be encompassed in the above electronic device, or exist alone without being assembled into the electronic device.

The above computer-readable medium carries one or more programs. When executed by the electronic device, the above one or more programs cause the electronic device to execute the method shown in the above embodiments.

The computer program codes configured to execute operations of the present disclosure may be written in one or more programming languages or combinations thereof. The above programming languages include, but are not limited to, object-oriented programming languages, such as Java, Smalltalk, and C++, and conventional procedural programming languages, such as "C" language. The program codes may be executed on a user's computer in all or in part, executed as an independent software package, executed on the user's computer in part and on a remote computer in part, or executed on the remote computer or a server in all. In a case involving the remote computer, the remote computer may be connected to the user's computer through any kind of network, including the local area network (LAN) or the wide area network (WAN), or may be connected to an external computer (for example, through the Internet on the basis of an Internet service provider).

The flowcharts and block diagrams in the accompanying drawings illustrate possibly implementable system architectures, functions, and operations of the systems, methods, and computer program products according to various embodiments of the present disclosure. In this regard, each block in the flowcharts or the block diagrams may represent a module, a program segment, or a code segment, which encompasses one or more executable instructions configured to implement specified logical functions. It should also be noted that in some alternative embodiments, the functions noted in the blocks may also occur in an order other than those noted in the accompanying drawings. For example, two blocks represented in succession may in fact be executed substantially in parallel or in a reverse order sometimes, depending on the functions involved. It should also be noted that each block in the block diagrams and/or the flowcharts and combinations of blocks in the block diagrams and/or the flowcharts may be implemented through special-purpose hardware-based systems that execute the specified functions or operations, or may be implemented through combinations of special-purpose hardware and computer instructions.

The unit described in the embodiments of the present disclosure may be implemented through software or hardware. The name of the unit is not intended to define of the unit under some circumstances, for example, a first acquisition unit can also be described as "a unit configured to acquire at least two Internet protocol addresses".

The above functions herein may be executed, at least in part, by one or more hardware logical components. For example, non-limited, illustrative types of usable hardware logical components may include: a field-programmable gate array (FPGA), an application specific integrated circuit (ASIC), application specific standard parts (ASSPs), a system on chip (SOC), or a complex programmable logic device (CPLD), and so on.

In the context of the present disclosure, a machine-readable medium may be a tangible medium that may encompass or store a program to be used by or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific instances of the machine-readable storage media may include a portable computer disc, a hard disc, a random access memory (RAM), a read-only memory (ROM), an erasable programmable read-only memory (EPROM) or a flash memory, an optical fiber, a portable compact disc read-only memory (CD-ROM), an optical storage device, a magnetic storage device that are each electrically connected through one or more wires, or any suitable combination thereof.

In a first embodiment of the first aspect, a method for audio playback is provided in an embodiment of the present disclosure. The method may include:
  receiving an instruction for rate adjustment, wherein the instruction for rate adjustment is configured to adjust an audio playback rate from a first multiple of a preset standard rate to a second multiple of the preset standard rate;
  creating a second audio filter according to the second multiple;
  calling the second audio filter to perform rate change processing according to the second multiple on second audio data in a first cache to obtain third audio data, wherein the second audio data is obtained after a first audio filter performs first processing on first audio data, and the first processing includes at least one of the following: audio decoding, a format conversion, sampling, and a channel conversion; and playing the third audio data.

Based on the first example of the first aspect, in a second example of the first aspect, the step of creating a second audio filter according to the second multiple includes:
  creating the second audio filter with the second multiple in response to determining that an unplayed-back audio data amount obtained through a rate change according to the first multiple reaches a preset unit playback amount.

Based on the second example of the first aspect, in a third example of the first aspect, before the step of calling the second audio filter to perform rate change processing according to the second multiple on second audio data in a first cache to obtain third audio data, the method further includes:
  deleting a first mark of the second audio data in the first cache, wherein the first mark is configured to indicate that the second audio data have undergone rate change processing but have not been played.

Based on the second example of the first aspect, in a fourth example of the first aspect, the method further includes:
  performing rate change processing on the second audio data in the first cache according to the first multiple in response to determining that an unplayed-back audio data amount obtained through the rate change according to the first multiple does not reach a preset unit playback amount, until the unplayed-back audio data amount obtained through the rate change according to the first multiple reaches the preset unit playback amount, and proceeds to a step of creating a second audio filter according to the second multiple.

Based on the third example of the first aspect, in a fifth example of the first aspect, the method further includes:
  configuring the second audio data with the first mark in the first cache before performing rate change processing on the second audio data in the first cache.

Based on the fifth example of the first aspect, in a sixth example of the first aspect, the method further includes:
  deleting the second audio data having the first mark from the first cache when an audio data amount obtained by performing rate change processing on the second audio data in the first cache reaches the preset unit playback amount.

Based on the first example of the first aspect, in a seventh example of the first aspect, the third audio data are stored in a second cache, and the step of playing the third audio data includes:

storing the third audio data from the second cache into a player cache and deleting the third audio data are the second cache when a data amount of the third audio data reaches the preset unit playback amount; and calling a player to play the third audio data in the player cache.

Based on the seventh example of the first aspect, in an eighth example of the first aspect, the step of calling the second audio filter to perform rate change processing according to the second multiple on second audio data in a first cache to obtain third audio data includes:

calling the second audio filter to perform rate change processing according to the second multiple on the second audio data in the first cache to obtain the third audio data, in response to determining that an audio data amount in the player cache is less than or equal to a first data amount threshold.

Based on the seventh example of the first aspect, in a ninth example of the first aspect, the method further includes:

adjusting a size of the first cache according to a preset function and the second multiple, wherein the preset function is configured to represent a corresponding relationship among a size of the player cache, the size of the first cache, and the audio playback rate.

In a first example of the second aspect, an electronic device is provided. The electronic device includes:

an instruction for rate adjustment reception module configured to receive an instruction for rate adjustment, wherein the instruction for rate adjustment is configured to adjust an audio playback rate from a first multiple of a preset standard rate to a second multiple of the preset standard rate;

a filter creation module configured to create a second audio filter with the second multiple;

a first rate change processing module configured to call the second audio filter to perform rate change processing according to the second multiple on second audio data in a first cache to obtain third audio data, wherein the second audio data is obtained after a first audio filter performs first processing on first audio data, and the first processing at least includes one of the following: audio decoding, a format conversion, sampling, and a channel conversion; and a first audio playback module configured to play the third audio data.

Based on the first example of the second aspect, in a second example of the second aspect, the filter creation module described above is further configured to:

create the second audio filter with the second multiple in response to determining that an unplayed-back audio data amount obtained through a rate change according to the first multiple reaches a preset unit playback amount.

Based on the second example of the second aspect, in a third example of the second aspect, the electronic device described above further includes:

a first mark deletion module configured to delete a first mark of the second audio data in the first cache before the step of calling the second audio filter to perform rate change processing according to the second multiple on second audio data in a first cache to obtain third audio data, wherein the first mark is configured to indicate that the second audio data have undergone rate change processing but have not been played.

Based on the second example of the second aspect, in a fourth example of the second aspect, the electronic device described above further includes:

a second rate change processing module configured to perform rate change processing on the second audio data in the first cache according to the first multiple in response to determining that an unplayed-back audio data amount obtained through the rate change according to the first multiple does not reach the preset unit playback amount, until the unplayed-back audio data amount obtained through the rate change according to the first multiple reaches the preset unit playback amount, proceed to a step of creating a second audio filter according to the second multiple.

Based on the third example of the second aspect, in a fifth example of the second aspect, the electronic device described above further includes:

a mark module configured to configure the second audio data with the first mark in the first cache before rate change processing is performed on the second audio data in the first cache.

Based on the fifth example of the second aspect, in a sixth example of the second aspect, the electronic device described above further includes:

an audio data deletion module configured to delete the second audio data having the first mark from the first cache when an audio data amount obtained by performing rate change processing on the second audio data in the first cache reaches the preset unit playback amount.

Based on the first example of the second aspect, in a seventh example of the second aspect, the third audio data are stored in a second cache, and the first audio playback module described above is further configured to:

store the third audio data from the second cache into a player cache and delete the third audio data from the second cache when a data amount of the third audio data reaches the preset unit playback amount; call a player to play the third audio data in the player cache.

Based on the seventh example of the second aspect, in an eighth example of the second aspect, the first rate change processing module described above is further configured to:

call the second audio filter to perform rate change processing according to the second multiple on the second audio data in the first cache to obtain the third audio data, in response to determining that an audio data amount in the player cache is less than or equal to a first data amount threshold.

Based on the seventh example of the second aspect, in a ninth example of the second aspect, the electronic device described above further includes:

a first cache size adjustment module configured to adjust a size of the first cache according to a preset function and the second multiple, wherein the preset function is configured to denote a corresponding relationship among a size of the player cache, the size of the first cache, and the audio playback rate.

In a third aspect, an electronic device is provided according to one or more embodiments of the present disclosure. The electronic device includes: at least one processor and a memory;

the memory stores computer-executable instructions; and the processor executes the computer-executable instructions to cause the electronic device to implement the method in the first aspect.

In a fourth aspect, a computer-readable storage medium is provided according to one or more embodiments of the present disclosure. The computer-readable storage medium stores computer-executable instructions, wherein the computer-executable instructions, when being executed by a processor, cause an electronic device to implement any of the methods in the first aspect.

In a fifth aspect, a computer program is provided according to one or more embodiments of the present disclosure. The computer program is configured to implement any of the methods in the first aspect.

In a sixth aspect, a computer program product is provided according to one or more embodiments of the present disclosure. The computer program product includes computer instructions, wherein the computer instructions is configured to implement any of the methods in the first aspect.

What are described above are merely the preferred embodiments of the present disclosure and the descriptions of the technical principles applied. It should be understood by those skilled in the art that the scope of present disclosure involved in the present disclosure is not limited to the technical solutions formed by specific combinations of the above technical features, and should also cover other technical solutions formed by any combinations of the above technical features or their equivalents without departing from the concept disclosed above. For example, the technical solutions formed through mutual replacement between the features described above and the technical features having similar functions disclosed in the present disclosure (but not limited thereto).

In addition, all the operations are depicted in a specific order. However, it should not be understood that these operations are required to be executed in the specific order shown or in a successive order. Under some circumstances, multitasking and parallel processing may be advantageous. Similarly, several specific embodiment details are encompassed in the above discussion, but should not be interpreted as limiting the scope of the present disclosure. Some features that are described in the context of separate embodiments may also be implemented jointly in a single example. Likewise, various features that are described in the context of a single example may also be implemented in multiple embodiments separately or in any suitable sub-combination manner.

Although the subject has been described in a language specific to structural features and/or logical method actions, it should be understood that the subject defined in the appended claims is not necessarily limited to the above specific features or actions. Rather, the above specific features and actions are merely illustrative forms for implementing the claims.

I claim:

1. A method for audio playback, comprising:
receiving an instruction for rate adjustment, wherein the instruction for rate adjustment is configured to adjust an audio playback rate from a first multiple of a preset standard rate to a second multiple of the preset standard rate;
creating a second audio filter according to the second multiple;
calling the second audio filter to perform rate change processing according to the second multiple on second audio data in a first cache to obtain third audio data, wherein the second audio data is obtained after a first audio filter performs first processing on first audio data, and the first processing comprises at least one of the following: audio decoding, a format conversion, sampling, and a channel conversion; and
playing the third audio data,
wherein the calling the second audio filter to perform rate change processing according to the second multiple on second audio data in a first cache to obtain third audio data comprises:
calling the second audio filter to perform the rate change processing according to the second multiple on the second audio data in the first cache to obtain the third audio data in response to determining that an audio data amount in a player cache is less than or equal to a first data amount threshold.

2. The method according to claim 1, wherein the creating a second audio filter according to the second multiple comprises:
creating the second audio filter with the second multiple in response to determining that an unplayed-back audio data amount obtained through a rate change according to the first multiple reaches a preset unit playback amount.

3. The method according to claim 2, further comprising:
performing rate change processing on the second audio data in the first cache according to the first multiple in response to determining that an unplayed-back audio data amount obtained through the rate change according to the first multiple does not reach a preset unit playback amount, and until the unplayed-back audio data amount obtained through the rate change according to the first multiple reaches the preset unit playback amount, proceeding into a step of creating a second audio filter according to the second multiple.

4. The method according to claim 1, wherein before the calling the second audio filter to perform rate change processing according to the second multiple on second audio data in a first cache to obtain third audio data, the method further comprises:
deleting a first mark of the second audio data in the first cache, wherein the first mark is configured to indicate that the second audio data have undergone rate change processing but have not been played.

5. The method according to claim 4, further comprising:
configuring the second audio data with the first mark in the first cache before rate change processing is performed on the second audio data in the first cache.

6. The method according to claim 5, further comprising:
deleting the second audio data having the first mark from the first cache when an audio data amount obtained by performing rate change processing on the second audio data in the first cache reaches the preset unit playback amount.

7. The method according to claim 1, wherein the third audio data are stored in a second cache, and the playing the third audio data comprises:
storing the third audio data from the second cache into a player cache and deleting the third audio data from the second cache when a data amount of the third audio data reaches the preset unit playback amount; and
calling a player to play the third audio data in the player cache.

8. The method according to claim 1, further comprising:
adjusting a size of the first cache according to a preset function and the second multiple, wherein the preset function is configured to represent a corresponding relationship among a size of a player cache, the size of the first cache, and the audio playback rate.

9. An electronic device, comprising: at least one processor and a memory;
the memory stores computer-executable instructions; and
wherein the processor executes the computer-executable instructions to cause the electronic device to:
receive an instruction for rate adjustment, wherein the instruction for rate adjustment is configured to adjust an audio playback rate from a first multiple of a preset standard rate to a second multiple of the preset standard rate;
create a second audio filter according to the second multiple;
call the second audio filter to perform rate change processing according to the second multiple on second audio data in a first cache to obtain third audio data, wherein the second audio data is obtained after a first audio filter performs first processing on first audio data, and the first processing comprises at least one of the following: audio decoding, a format conversion, sampling, and a channel conversion; and
play the third audio data,
wherein calling the second audio filter to perform rate change processing according to the second multiple on second audio data in a first cache to obtain third audio data comprises:
calling the second audio filter to perform the rate change processing according to the second multiple on the second audio data in the first cache to obtain the third audio data in response to determining that an audio data amount in a player cache is less than or equal to a first data amount threshold.

10. The electronic device according to claim 9, wherein the processor executes the computer-executable instructions to further cause the electronic device to:
adjust a size of the first cache according to a preset function and the second multiple, wherein the preset function is configured to represent a corresponding relationship among a size of a player cache, the size of the first cache, and the audio playback rate.

11. A non-transitory computer-readable storage medium, storing computer-executable instructions, wherein the computer-executable instructions, when being executed by a processor, cause an electronic device to:
receive an instruction for rate adjustment, wherein the instruction for rate adjustment is configured to adjust an audio playback rate from a first multiple of a preset standard rate to a second multiple of the preset standard rate;
create a second audio filter according to the second multiple;
call the second audio filter to perform rate change processing according to the second multiple on second audio data in a first cache to obtain third audio data, wherein the second audio data is obtained after a first audio filter performs first processing on first audio data, and the first processing comprises at least one of the following: audio decoding, a format conversion, sampling, and a channel conversion; and
play the third audio data,
wherein calling the second audio filter to perform rate change processing according to the second multiple on second audio data in a first cache to obtain third audio data comprises:
calling the second audio filter to perform the rate change processing according to the second multiple on the second audio data in the first cache to obtain the third audio data in response to determining that an audio data amount in a player cache is less than or equal to a first data amount threshold.

12. The electronic device according to claim 9, wherein the electronic device being caused to create a second audio filter according to the second multiple comprises being caused to:
create the second audio filter with the second multiple in response to determining that an unplayed-back audio data amount obtained through a rate change according to the first multiple reaches a preset unit playback amount.

13. The electronic device according to claim 12, wherein the processor executes the computer-executable instructions to further cause the electronic device to:
perform rate change processing on the second audio data in the first cache according to the first multiple in response to determining that an unplayed-back audio data amount obtained through the rate change according to the first multiple does not reach a preset unit playback amount, and until the unplayed-back audio data amount obtained through the rate change according to the first multiple reaches the preset unit playback amount, proceed into a step of creating a second audio filter according to the second multiple.

14. The electronic device according to claim 9, wherein before the electronic device being caused to call the second audio filter to perform rate change processing according to the second multiple on second audio data in a first cache to obtain third audio data, the processor executes the computer-executable instructions to further cause the electronic device to:
delete a first mark of the second audio data in the first cache, wherein the first mark is configured to indicate that the second audio data have undergone rate change processing but have not been played.

15. The electronic device according to claim 14, wherein the processor executes the computer-executable instructions to further cause the electronic device to:
configure the second audio data with the first mark in the first cache before rate change processing is performed on the second audio data in the first cache.

16. The electronic device according to claim 15, wherein the processor executes the computer-executable instructions to further cause the electronic device to:
delete the second audio data having the first mark from the first cache when an audio data amount obtained by performing rate change processing on the second audio data in the first cache reaches the preset unit playback amount.

17. The electronic device according to claim 9, wherein the third audio data are stored in a second cache, and the electronic device being caused to play the third audio data comprises being caused to:
store the third audio data from the second cache into a player cache and deleting the third audio data from the second cache when a data amount of the third audio data reaches the preset unit playback amount; and
call a player to play the third audio data in the player cache.

18. The non-transitory computer-readable storage medium according to claim 11, wherein the computer-executable instructions, when being executed by a processor, cause the electronic device to:
create the second audio filter with the second multiple in response to determining that an unplayed-back audio data amount obtained through a rate change according to the first multiple reaches a preset unit playback amount.

\* \* \* \* \*